(12) United States Patent
Ando et al.

(10) Patent No.: US 10,928,858 B2
(45) Date of Patent: Feb. 23, 2021

(54) DISPLAY PANEL WITH PRESSING SENSOR AND ELECTRONIC DEVICE WITH PRESSING INPUT FUNCTION

(71) Applicant: Murata Manufacturing Co., Ltd., Nagaokakyo (JP)

(72) Inventors: Masamichi Ando, Nagaokakyo (JP); Jun Endo, Nagaokakyo (JP); Hideki Kawamura, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 96 days.

(21) Appl. No.: 14/744,474

(22) Filed: Jun. 19, 2015

(65) Prior Publication Data
US 2015/0338980 A1  Nov. 26, 2015

Related U.S. Application Data (63) Continuation of application No. PCT/JP2014/051456, filed on Jan. 24, 2014.

(30) Foreign Application Priority Data

Feb. 1, 2013 (JP) .............................. JP2013-018771

(51) Int. Cl.
*G06F 1/16* (2006.01)
*G02F 1/1333* (2006.01)
(Continued)

(52) U.S. Cl.
CPC ........ *G06F 1/1643* (2013.01); *G02F 1/13338* (2013.01); *G02F 1/133553* (2013.01);
(Continued)

(58) Field of Classification Search
CPC ...... G02B 5/30; G02B 5/3083; G02B 5/3008; G02B 5/3016; G02F 1/13338;
(Continued)

(56) References Cited

U.S. PATENT DOCUMENTS

2006/0108050 A1* 5/2006 Satake ................. B32B 7/06
156/101
2007/0207277 A1* 9/2007 Mizushima ........... B29C 55/023
428/1.31
(Continued)

FOREIGN PATENT DOCUMENTS

JP  2003-186622 A  7/2003
JP  2011-002926 A  1/2011
(Continued)

OTHER PUBLICATIONS

International Search Report issued for PCT/JP2014/051456, dated Apr. 28, 2014.
(Continued)

*Primary Examiner* — Patrick N Edouard
*Assistant Examiner* — Douglas M Wilson
(74) *Attorney, Agent, or Firm* — Arent Fox LLP (57) ABSTRACT

An electronic device with pressing input function has a substantially rectangular parallelepiped housing. In the housing, a pressing sensor, a display panel, a protection member, and a computation circuit module are arranged. In the display panel, a polarization plate is arranged on a first side of a liquid crystal panel. In the pressing sensor, electrodes are formed on both planar faces of a piezoelectric film having double refractivity. The pressing sensor is arranged on the operation surface (the display face) side of the housing relative to the front polarization plate.

15 Claims, 5 Drawing Sheets

(51) Int. Cl.
*G06F 3/041* (2006.01)
*B29K 67/00* (2006.01)
*G02B 5/30* (2006.01)
*G02F 1/1335* (2006.01)

(52) U.S. Cl.
CPC ...... *G06F 3/0414* (2013.01); *B29K 2067/046* (2013.01); *B29K 2995/0003* (2013.01); *B29K 2995/0026* (2013.01); *G02B 5/30* (2013.01); *G02B 5/3083* (2013.01); *G06F 3/0412* (2013.01)

(58) Field of Classification Search
CPC ....... G02F 1/1396; G02F 2001/133531; G02F 2001/133638; G02F 2203/02; G06F 1/1643; G06F 3/0412; G06F 3/0414; G06F 2203/04106; G06F 3/044; G09G 2320/0242; G09G 2300/0478; G10H 2220/531; G10H 2220/535; B29K 2067/046; B29K 2995/0003

See application file for complete search history.

(56) References Cited

U.S. PATENT DOCUMENTS

| | | | |
|---|---|---|---|
| 2008/0143926 A1* | 6/2008 | Amimori | G02B 5/3083 349/75 |
| 2008/0165158 A1* | 7/2008 | Hotelling | G06F 3/0412 345/174 |
| 2009/0168169 A1* | 7/2009 | Jeong | G06F 3/045 359/485.01 |
| 2012/0086651 A1 | 4/2012 | Kwon et al. | |
| 2012/0127136 A1 | 5/2012 | Schneider et al. | |
| 2012/0132846 A1* | 5/2012 | Yoshida | B29C 71/02 252/62.9 R |
| 2012/0140145 A1* | 6/2012 | Hanamoto | G09G 5/04 349/62 |
| 2013/0016059 A1* | 1/2013 | Lowles | G06F 3/044 345/174 |
| 2013/0027340 A1* | 1/2013 | Kodani | H01L 41/193 345/173 |
| 2013/0057499 A1 | 3/2013 | Ando et al. | |
| 2013/0108061 A1 | 5/2013 | Ando et al. | |
| 2013/0234977 A1* | 9/2013 | Lin | G06F 3/0418 345/174 |
| 2013/0234988 A1 | 9/2013 | Ando et al. | |
| 2013/0257744 A1* | 10/2013 | Daghigh | G06F 3/0416 345/173 |
| 2013/0257759 A1* | 10/2013 | Daghigh | G06F 3/04144 345/173 |
| 2014/0028931 A1 | 1/2014 | Tsurusaki et al. | |
| 2015/0309641 A1* | 10/2015 | Hotelling | G06F 3/041 345/174 |
| 2015/0331517 A1* | 11/2015 | Filiz | G06F 3/044 345/173 |
| 2015/0331540 A1* | 11/2015 | Lee | G06F 3/0446 345/174 |
| 2017/0261794 A1* | 9/2017 | Murata | G02F 1/1336 |

FOREIGN PATENT DOCUMENTS

| | | |
|---|---|---|
| JP | 2011-040025 A | 2/2011 |
| JP | 2011-253517 A | 12/2011 |
| JP | 2012-049789 A | 3/2012 |
| JP | 2012-230657 A | 11/2012 |
| JP | 2013-015749 A | 1/2013 |
| WO | WO 2011/125408 A1 | 10/2011 |
| WO | WO 2011125388 A1 * 10/2011 | ............. G06F 3/041 |
| WO | WO-2011125388 A1 * 10/2011 | ........... H01L 41/193 |
| WO | WO 2012/049969 A1 | 4/2012 |
| WO | WO 2012/141071 A1 | 10/2012 |

OTHER PUBLICATIONS

Masamichi Ando et al., Film Sensor Device Fabricated by a Piezoelectric Poly (L-lactic acid); Japanese Journal of Applied Physics, vol. 51, 2012, pp. 1-4.

Written Opinion of the International Searching Authority issued for PCT/JP2014/051456, dated Apr. 28, 2014.

* cited by examiner

DISPLAY PANEL WITH PRESSING SENSOR AND ELECTRONIC DEVICE WITH PRESSING INPUT FUNCTION

CROSS REFERENCE TO RELATED APPLICATIONS

The present application is a continuation of International application No. PCT/JP2014/051456, filed Jan. 24, 2014, which claims priority to Japanese Patent Application No. 2013-018771, filed Feb. 1, 2013, the entire contents of each of which are incorporated herein by reference.

FIELD OF THE INVENTION

The present invention relates to a display panel with pressing sensor capable of pressing operation input by operating a display screen with a finger, and an electronic device with pressing input function having the display panel with pressing sensor.

BACKGROUND OF THE INVENTION

Various electronic devices having a thin display panel, such as a liquid crystal display, capable of operation input on a display face have been contrived. For instance, in Patent Literature 1, a touch sensor detecting an operation position is arranged on the front side of a display panel. When the operator touches an operation surface, the touch sensor detects the touch position. An electronic device executes a process according to the operation position.

In the conventional electronic device with the touch sensor, when the display panel requiring a polarization plate, such as a liquid crystal panel, is used, the components of the electronic device are arranged in the following position relation.

The front polarization plate is arranged on the operation surface (outermost face). The touch panel is arranged on the face of the front polarization plate on the opposite side of the operation surface. On the face of the touch panel on the opposite side of the front polarization plate, the liquid crystal panel having a pair of glasses sandwiching the liquid crystal therebetween is arranged. On the face of the liquid crystal panel on the opposite side of the touch panel, the back polarization plate is arranged. That is, the touch panel is arranged between the front and back polarization plates.

In the above structure, when the liquid crystal display is of the transmissive type, a light from the backlight arranged on the back side of the back polarization plate is transmitted through the back polarization plate, the liquid crystal panel, the touch panel, and the front polarization plate in this order, and is emitted to the operation surface. When the liquid crystal display is of the reflective type, the reflection plate is arranged in place of the back polarization plate, so that a light incident from the operation surface is transmitted through the front polarization plate, the touch panel, the liquid crystal panel, the reflection plate, the liquid crystal panel, the touch panel, and the front polarization plate in this order, and is returned to the operation surface.

Here, the front and back polarization plates transmit only a wave (light wave) vibrated in a particular direction, and are combined with the liquid crystal panel to have predetermined values of contrast and light transmittance, thereby improving the appearance.

Patent Literature 1: Japanese Patent Application Laid-Open (JP-A) No. 2012-230657

SUMMARY OF THE INVENTION

However, in the conventional electronic device having the thin display panel, the following problems arise.

At present, considered is a pressing sensor having a piezoelectric element, such as a chiral polymer, to be capable of detecting a pressing amount. However, the piezoelectric element, such as a chiral polymer, has double refractivity. For instance, a wave vibrated in the direction parallel to the stretching direction of uniaxially stretched poly-L-lactic acid (PLLA) has a refractive index of 1.47. On the other hand, a wave vibrated in the direction perpendicular to the stretching direction of uniaxially stretched poly-L-lactic acid (PLLA) has a refractive index of 1.45. That is, the pressing sensor has a retardation characteristic.

When the thin display panel into which such a pressing sensor having double refractivity is incorporated is of the transmissive type and is arranged between the front and back polarization plates, or when the thin display panel is of the reflective type and guides a light through the front polarization plate twice, the target color is changed, whereby the desired image color cannot be obtained.

Accordingly, an object of the present invention is to provide a display panel with pressing sensor capable of detecting a pressing amount by a piezoelectric element, such as a chiral polymer, thereby reproducing desired color.

A display panel with pressing sensor of the present invention includes a display panel and a pressing sensor. The display panel has an image forming panel forming a display image by controlling a light emitted to a front side, and a front polarization plate arranged on the front side of the image forming panel. The pressing sensor has a piezoelectric film formed of a chiral polymer. The piezoelectric film is arranged on the opposite side of the image forming panel across the front polarization plate.

With this structure, the light emitted from the front polarization plate to the operator side is transmitted through the piezoelectric film. Thus, even the piezoelectric film having double refractivity does not change the color of the image by the emitted light.

In the display panel with pressing sensor of the present invention, preferably, the pressing sensor is arranged on the front side from the front polarization plate.

With this structure, the pressing sensor is arranged on the operation surface side from the display panel, so that the pressing amount detection sensitivity can be improved.

In the display panel with pressing sensor of the present invention, preferably, the chiral polymer forming the piezoelectric film is polylactic acid, the polylactic acid being at least uniaxially stretched.

With this structure, the specific material example of the piezoelectric film is given. By using the polylactic acid which is at least uniaxially stretched, the pressing amount detection sensitivity is high, so that the pressing sensor can be excellent in temperature characteristic.

In the display panel with pressing sensor of the present invention, preferably, the pressing sensor and the display panel are spaced from each other.

With this structure, the pressing sensor and the display panel are spaced from each other, so that the pressing sensor which is curved by pressing cannot be brought into contact with the front polarization plate of the display panel. This can prevent damage to the front polarization plate and the change in the color of the light emitted from the front polarization plate deformed by pressing. In addition, the pressing sensor is not brought contact with the display panel, so that the pressing sensor can be deformed irrespective of the rigidity of the display panel. A gap may be formed between the pressing sensor and the display panel, so that a buffer member, such as a resilient substance, which does not inhibit the pressing sensor from being curved, may also be arranged.

The display panel with pressing sensor of the present invention may have the following structure. The pressing sensor has a planar position detection sensor function detecting a touch position.

The present invention provides an electronic device with pressing input function, which has the following feature. The electronic device with pressing input function has the display panel with pressing sensor, a computation unit detecting a pressing amount from a detection signal from the pressing sensor, and a housing opened on the display face side and accommodating the display panel with pressing sensor and the computation unit.

With this structure, even when the electronic device has the pressing sensor using the piezoelectric film having double refractivity, the color of the light emitted from the display panel and the front polarization plate is visible to the operator without being changed.

According to the present invention, even the display panel including the pressing sensor having double refractivity can reproduce the desired color.

DETAILED DESCRIPTION OF THE INVENTION

Figure 1:
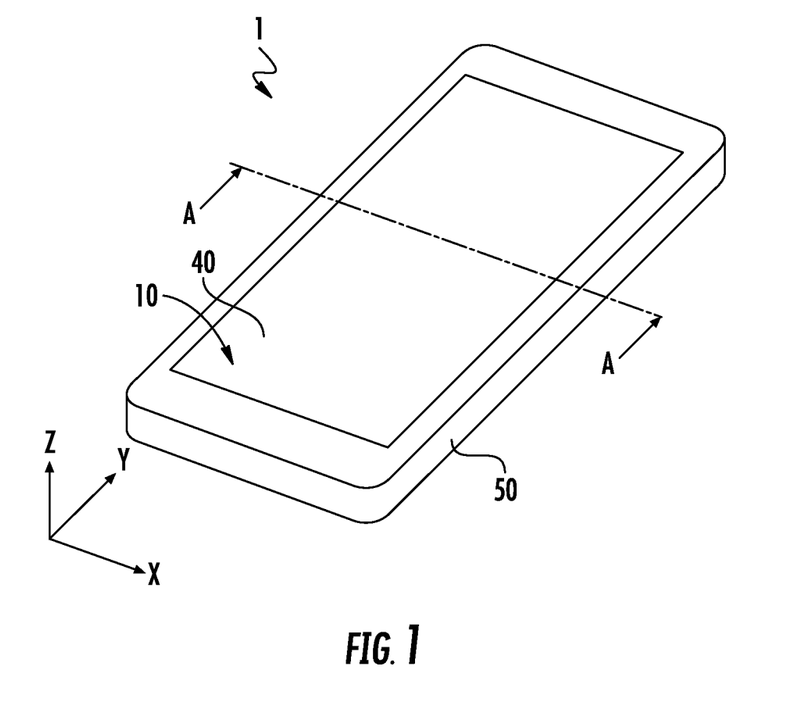
FIG. 1 is an appearance perspective view of an electronic device with pressing input function according to a first embodiment of the present invention.
Figure 2:
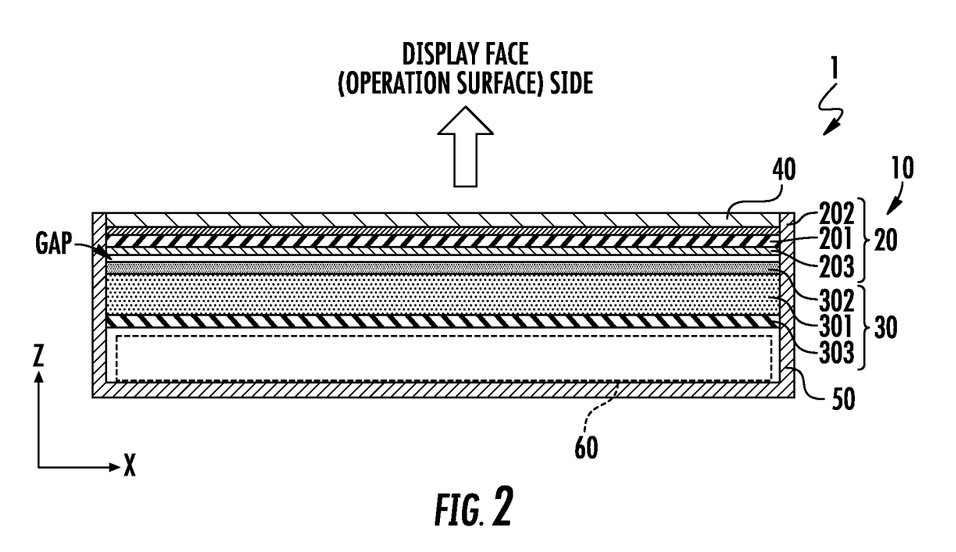
FIG. 2 is a cross-sectional view of the electronic device with pressing input function according to the first embodiment of the present invention.
Figure 3:
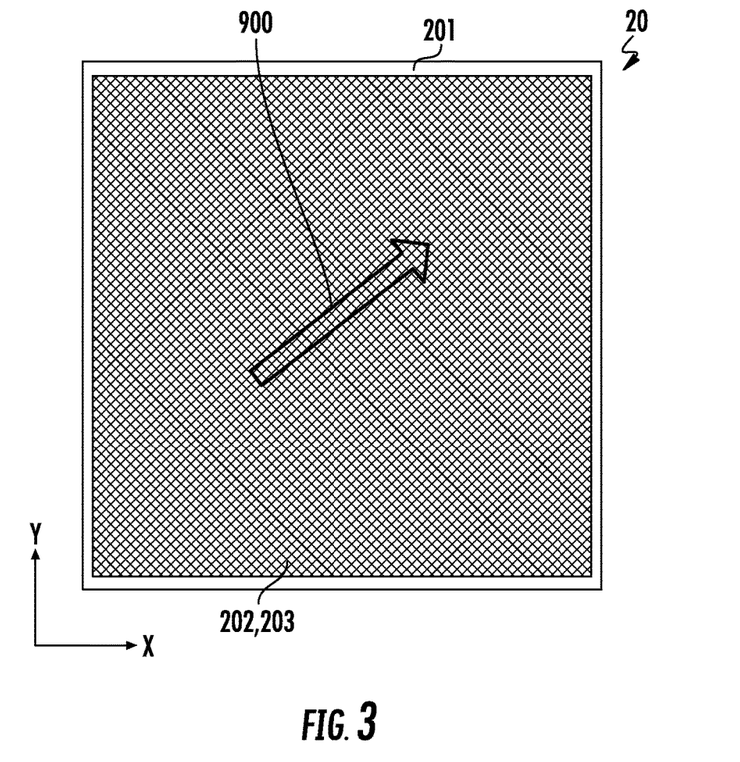
FIG. 3 is a plan view of a pressing sensor according to the first embodiment of the present invention.

An electronic device with pressing input function according to a first embodiment of the present invention and a display panel with pressing sensor provided therein will be described with reference to the drawings. FIG. 1 is an appearance perspective view of the electronic device with pressing input function according to the first embodiment of the present invention. FIG. 2 is a cross-sectional view of the electronic device with pressing input function according to the first embodiment of the present invention. FIG. 3 is a plan view of a pressing sensor according to the first embodiment of the present invention.

As illustrated in FIG. 1, an electronic device 1 with pressing input function has a substantially rectangular parallelepiped housing 50. The housing 50 is opened on the front side. Hereinafter, the X direction indicates the width direction (the horizontal direction) of the housing 50, the Y direction indicates the length direction (the vertical direction) thereof, and the Z direction indicates the thickness direction thereof. In the description of this embodiment, the length in the X direction of the housing 50 is shorter than the length in the Y direction of the housing 50. However, the length in the X direction and the length in the Y direction may be the same, or the length in the X direction may be longer than the length in the Y direction.

As illustrated in FIG. 2, a pressing sensor 20, a display panel 30, a protection member 40, and a computation circuit module 60 are arranged in the housing 50. The protection member 40, the pressing sensor 20, the display panel 30, and the computation circuit module 60 are arranged in this order along the Z direction from the opening face (the display face) side of the housing 50. Here, the portion having the pressing sensor 20 and the display panel 30 is a display panel 10 with pressing sensor.

As illustrated in FIG. 3, the pressing sensor 20 has a flat piezoelectric film 201. On both planar faces (principal planes) of the piezoelectric film 201, electrodes 202 and 203 are formed. The electrodes 202 and 203 are formed on substantially the entire planar faces of the piezoelectric film 201.

The piezoelectric film 201 is a film formed of a chiral polymer. In this embodiment, as the chiral polymer, polylactic acid (PLA), in particular, poly-L-lactic acid (PLLA), is used. PLLA is uniaxially stretched.

The piezoelectric film 201 is rectangular to extend in the X and Y directions orthogonal to each other. A uniaxial stretching direction 900 is at approximately 45° with respect to the X and Y directions. This angle is only an example, and is a matter of design variation defined according to design. This angle is preferably 45° with respect to the direction of major stress generated at pressing the protection member 40.

Such PLLA formed of the chiral polymer has a main chain of a helical structure. PLLA is uniaxially stretched for molecular orientation, thereby having piezoelectric properties. Uniaxially stretched PLLA generates electric charge by pressing the planar face of the piezoelectric film. The amount of electric charge generated is uniquely determined according to the amount of displacement in which the planar face is displaced in the direction orthogonal to the planar face by pressing.

Uniaxially stretched PLLA has a very high piezoelectric constant as compared with other polymers. Thus, PLLA can detect displacement by pressing and releasing at high sensitivity.

The stretching magnification is preferably approximately 3 to 8 times. Thermal treatment after stretching promotes crystallization of the extended chain crystal of polylactic acid, thereby improving the piezoelectric constant. Biaxial stretching can obtain the same effect as uniaxial stretching by making the stretching magnifications of the respective axes different. For instance, biaxial stretching eight times in an X-axis direction and two times in a Y-axis direction orthogonal to the X-axis direction can have almost the same piezoelectric constant as uniaxial stretching four times in the X-axis direction. Since a film which is simply uniaxially stretched is likely to be torn in the stretching axis direction, such biaxial stretching is performed for improving the strength to some extent.

PLLA exhibits piezoelectric properties in the molecular orientation process by stretching, and is not required to be subjected to a poling process, unlike other polymers, such as PVDF, and piezoelectric ceramics. That is, the piezoelectric properties of PLLA which is not a ferroelectric substance are not exhibited by ionic polarization, unlike other ferroelectric substances, such as PVDF and PZT, but are exhibited by the helical structure which is a molecular characteristic structure. Thus, PLLA exhibits no pyroelectric properties exhibited by other ferroelectric piezoelectric substances. Further, the piezoelectric constant of PVDF is changed with time, and in some cases, can be significantly lowered, whereas the piezoelectric constant of PLLA is very stable with time. Thus, PLLA can detect displacement by pressing and releasing at high sensitivity without being affected by the ambient environment.

PLLA has a very low relative permittivity which is approximately 2.5, and has a large piezoelectric output constant (=piezoelectric g constant, $g=d/\varepsilon^T$ where d is a piezoelectric constant, and $\varepsilon^T$ is a dielectric constant). Here, from the above equation, the piezoelectric g constant of PVDF in which dielectric constant $\varepsilon_{33}^T=13\times\varepsilon_0$ and piezoelectric constant $d_{31}=25$ pC/N is $g_{31}=0.2172$ Vm/N. Meanwhile, the piezoelectric g constant of PLLA in which piezoelectric constant $d_{14}=10$ pC/N is converted into $g_{31}$, and from $d_{14}=2\times d_{31}$, $d_{31}=5$ pC/N, so that the piezoelectric g constant of PLLA is $g_{31}=0.2258$ Vm/N. Thus, PLLA in which piezoelectric constant $d_{14}=10$ pC/N can sufficiently obtain the same pressing amount detection sensitivity as PVDF. The present inventors have experimentally obtained PLLA in which $d_{14}=15$ to 20 pC/N, which can detect pressing and releasing at very high sensitivity.

As the electrodes 202 and 203, it is preferable to use either of an inorganic electrode, such as ITO, ZnO, silver nanowire, carbon nanotube, and graphene, or an organic electrode mainly containing polythiophene and polyaniline. By using these materials, the conductor pattern can have high light transmittance. By providing the electrodes 202 and 203, electric charge generated by the piezoelectric film 201 can be obtained as a potential difference, and the piezoelectric detection signal of a voltage value according to pressing amount can be outputted to outside. The piezoelectric detection signal is outputted to the computation circuit module 60 via wiring, not illustrated. The computation circuit module computes a pressing amount from the piezoelectric detection signal.

Such PLLA has double refractivity. Specifically, PLLA has a refractive index of approximately 1.47 in the stretching direction, and has a refractive index of approximately 1.45 in the direction orthogonal to the stretching direction. Thus, the piezoelectric film 201, that is, the pressing sensor, exhibits retardation.

As illustrated in FIG. 2, the display panel 30 has a planar liquid crystal panel 301, a front polarization plate 302, and a back reflection plate 303. The liquid crystal panel 301 to which a driving electrode is applied from outside changes a liquid crystal orientation state so as to form a predetermined image pattern. The front polarization plate 302 transmits only a light wave vibrated in a predetermined direction. The back reflection plate 303 reflects a light from the liquid crystal panel 301 side to the liquid crystal panel 301 side. In the display panel 30 having such a structure, a light from the display face side is transmitted through the front polarization plate 302 and the liquid crystal panel 301 to reach the back reflection plate 303, is reflected by the back reflection plate 303, and is emitted to the display face side through the liquid crystal panel 301 and the front polarization plate 302. The polarization properties of the front polarization plate 302 and the polarization properties in the liquid crystal orientation state are controlled, so that the display panel 30 forms the desired display image by the light emitted to the display face side.

The protection member 40 is a plate having insulation and light transmittance, and not having double refractivity. Further, the protection member 40 should have high resistance to the external environment. For instance, the protection member 40 should be made of glass. The protection member 40 preferably has predetermined flexibility.

In the display panel 10 with pressing sensor and the electronic device 1 with pressing input function having such structures, the operator can view the display screen in the following principle. A light incident from the display face (the operation surface) side of the housing 50 is incident to the pressing sensor 20 through the protection member 40. The light which is transmitted through the pressing sensor 20 is incident to the display panel 30. The light incident to the display panel 30 becomes a light forming a display image in predetermined color and pattern (a display image forming light), and is emitted from the display panel 30 to the pressing sensor 20 side. The display image forming light is transmitted through the pressing sensor 20, and is emitted to the protection member 40 side. The display image forming light is transmitted through the protection member 40, and is emitted from the opening face of the housing 50 to the display face side, so as to be visible to the operator.

Here, in the structure of this embodiment, the display image forming light emitted from the display panel 30 is inputted to the pressing sensor 20, so that the color of the display image forming light is not affected and not changed by the double refractivity of the pressing sensor 20.

More specifically, in the conventional structure, since the pressing sensor 20 is arranged between the liquid crystal panel 301 and the front polarization plate 302, a light double-refracted by the pressing sensor 20 is outputted to outside through the front polarization plate 302. The polarized light from the liquid crystal panel 301 is retarded by the pressing sensor 20, and is polarized by the front polarization plate 302, with the result that the light cannot have the desired color. That is, one nicol occurs. However, in the structure of this embodiment, the display image forming light outputted from the display panel 30 in the desired color is simply transmitted through the pressing sensor 20, so that the desired color outputted from the display panel 30 is directly visible to the operator. That is, no one nicol occurs.

In this manner, in the structure of this embodiment including the pressing sensor having the piezoelectric film formed of the chiral polymer, the desired color displayed on the display panel can be provided to the operator without being hardly changed.

In the above embodiment, gap Gap is provided between the pressing sensor 20 and the display panel 30. By providing gap Gap, the pressing sensor 20 which is curved by pressing is not brought into contact with the front polarization plate 302. This can prevent damage to the front polarization plate 302 and the change in the color of the light emitted from the front polarization plate due to pressing. Further, pressing of the pressing sensor 20 is not limited, so that the pressing amount can be detected with high accuracy.

A display panel with pressing sensor according to a second embodiment of the present invention will be described with reference to the drawings. The basic structure of the outer shape of an electronic device 1A with pressing input function of this embodiment is the same as the electronic device 1 with pressing input function of the first embodiment except that the structure of a display panel 10A with pressing sensor is different. Thus, only the points different from the display panel 10 with pressing sensor of the first embodiment will be specifically described.

Figure 4:
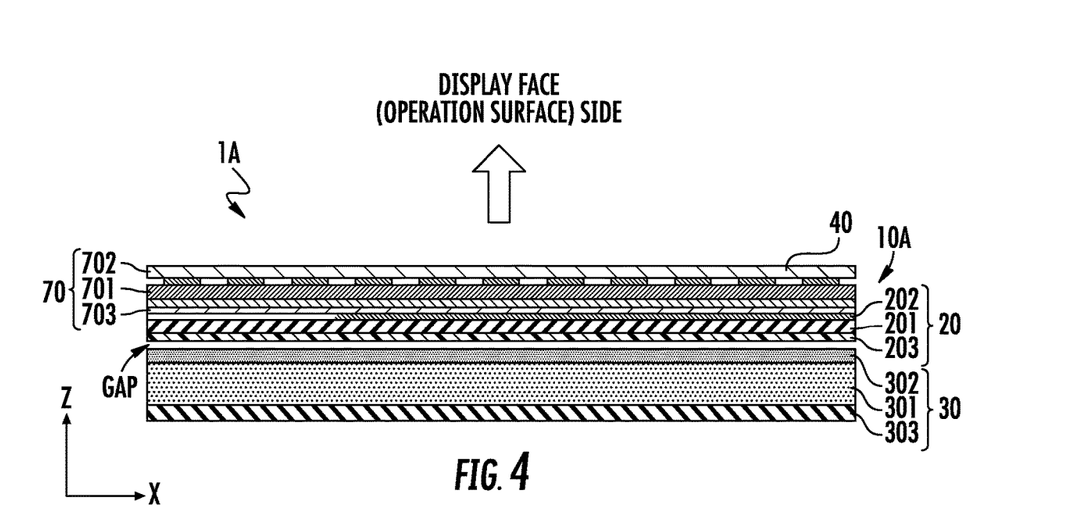
FIG. 4 is a cross-sectional view of a display panel with pressing sensor according to a second embodiment of the present invention.
Figure 5A:
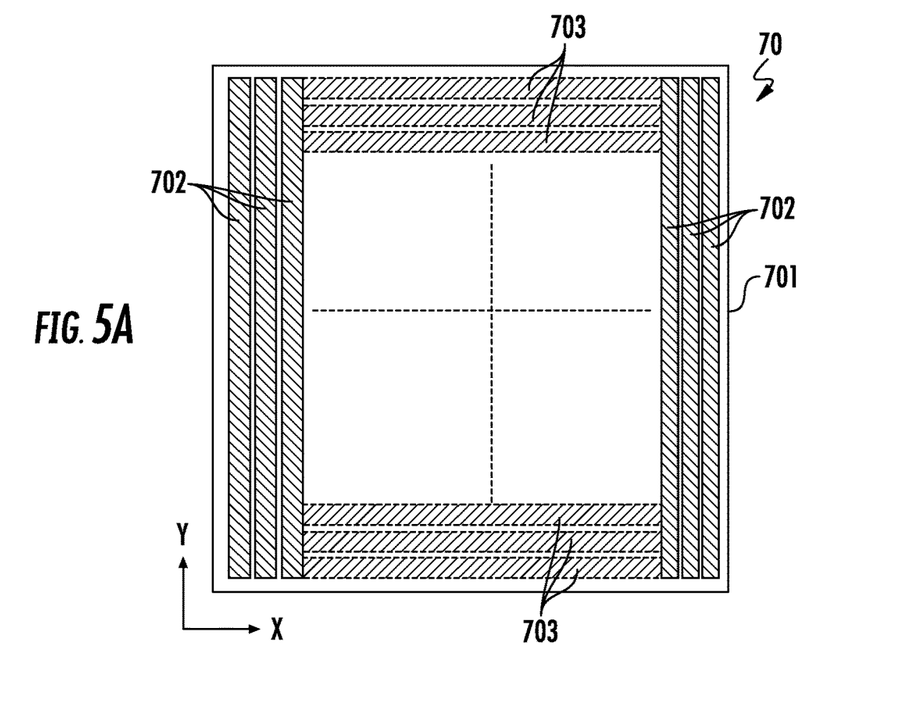
FIGS. 5A and 5B are plan views of a touch sensor and a position detection sensor according to the second embodiment of the present invention.
Figure 5B:
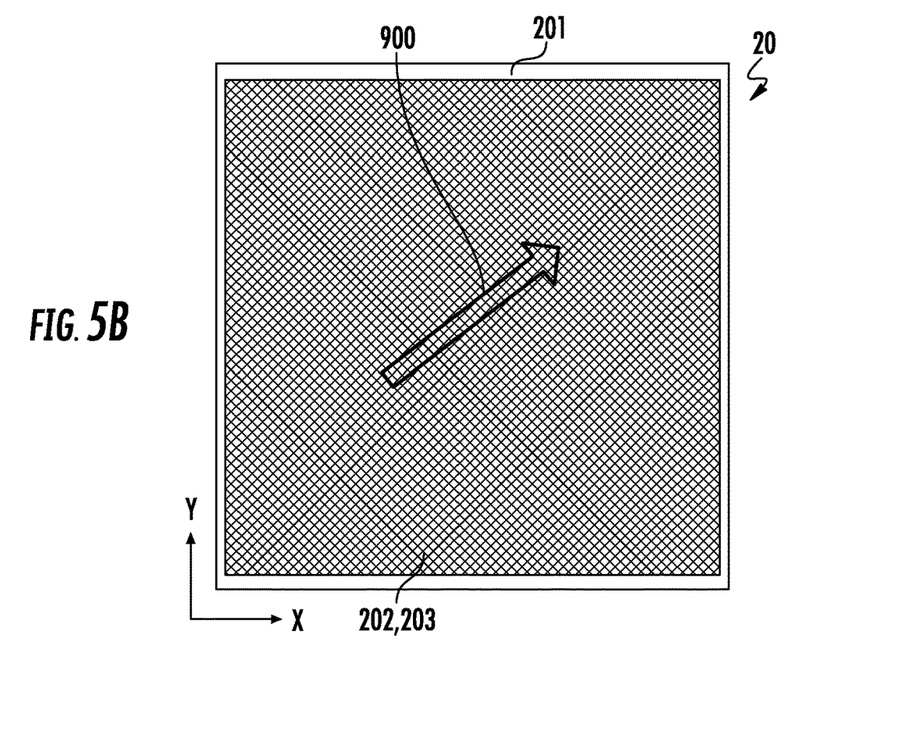

FIG. 4 is a cross-sectional view of the display panel with pressing sensor according to the second embodiment of the present invention. FIGS. 5A and 5B are plan views of a pressing sensor and a position detection sensor according to the second embodiment of the present invention.

As illustrated in FIG. 4, the display panel 10A with pressing sensor of this embodiment has a position detection sensor 70. The position detection sensor 70 has a planar insulation substrate 701. The insulation substrate 701 is made of a material having light transmittance. As illustrated in FIG. 5A, a plurality of electrodes 702 are formed on one planar face of the insulation substrate 701. The plurality of the electrodes 702 are long, their longer side direction being along the Y-direction. The plurality of the electrodes 702 are spaced from each other along the X-direction. A plurality of electrodes 703 are formed on the other planar face of the insulation substrate 701. The plurality of the electrodes 703 are long, their longer side direction being along the X-direction. The plurality of the electrodes 703 are spaced from each other in the Y-direction. Like the electrodes 202 and 203 of the pressing sensor 20, the plurality of the electrodes 702 and 703 are made of a material having light transmittance.

The position detection sensor 70 uses the electrodes 702 and 703 to detect the change in electrostatic capacity caused when the finger of the operator is close thereto, and outputs an electrostatic capacity detection signal to the computation circuit module 60. The computation circuit module 60 detects an operation position from the combination of the electrodes 702 and 703 in which the electrostatic capacity detection signal is detected.

As illustrated in FIG. 4, the position detection sensor 70 is arranged between the pressing sensor 20 and the protection member 40. With such a structure, like the first embodiment, the desired color displayed on the display panel can be provided to the operator. Further, by using the structure of this embodiment, not only the pressing amount, but also the operation position, can be detected.

Figure 6:
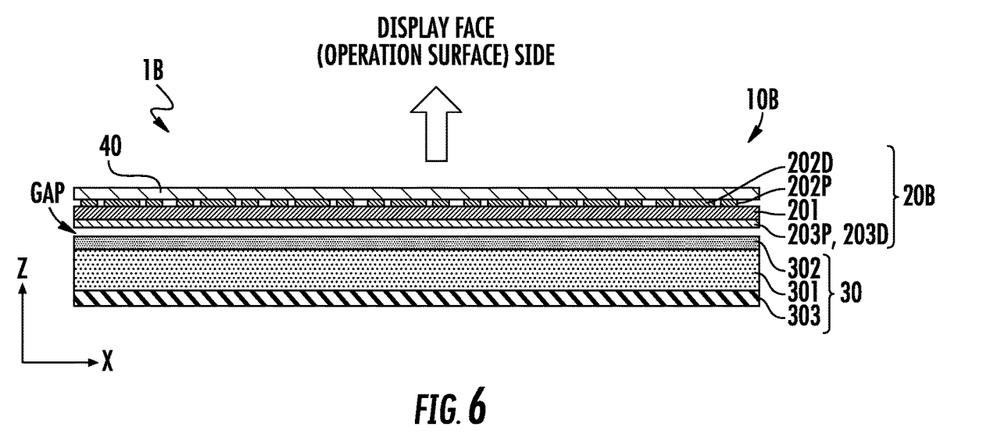
FIG. 6 is a cross-sectional view of a display panel with pressing sensor according to a third embodiment of the present invention.

A display panel with pressing sensor according to a third embodiment of the present invention will be described with reference to the drawing. The basic structure of the outer shape of an electronic device with pressing input function of this embodiment is the same as the electronic device 1A with pressing input function of the second embodiment except that the structure of a display panel 10B with pressing sensor is different. Thus, only the points different from the display panel 10A with pressing sensor of the second embodiment will be specifically described. FIG. 6 is a cross-sectional view of the display panel with pressing sensor according to the third embodiment of the present invention.

The display panel 10B with pressing sensor of this embodiment has a pressing sensor 20B. The pressing sensor 20B has the piezoelectric film 201.

The piezoelectric film 201 has a first planar face on which a piezoelectric detection electrode 202P and an electrostatic capacity detection electrode 202D are formed. The piezoelectric detection electrode 202P and the electrostatic capacity detection electrode 202D are formed in a predetermined pattern. The piezoelectric detection electrode 202P and the electrostatic capacity detection electrode 202D are not conducted to each other.

The piezoelectric film 201 has a second planar face on which a piezoelectric detection electrode 203P and an elec-trostatic capacity detection electrode 203D are formed. The piezoelectric detection electrode 203P and the electrostatic capacity detection electrode 203D are formed in a predetermined pattern. The piezoelectric detection electrode 203P and the electrostatic capacity detection electrode 203D are not conducted to each other.

The piezoelectric detection electrodes 202P and 203P are formed in a shape capable of detecting a voltage by electric charge generated by the curved piezoelectric film 201. The electrostatic capacity detection electrodes 202D and 203D are formed in a shape capable of detecting the change in electrostatic capacity generated by operating the operation surface by the operator.

The piezoelectric detection electrodes 202P and 203P and the electrostatic capacity detection electrodes 202D and 203D are made of a material having light transmittance.

With such a structure, the pressing sensor 20B using the single piezoelectric film 201 can detect the pressing amount and the operation position.

Even with such a structure, like the above embodiments, the desired color displayed on the display panel can be provided to the operator. Further, the display panel with pressing sensor and the electronic device with pressing input function, which can detect the pressing amount and the operation position, can be thin.

Figure 7:
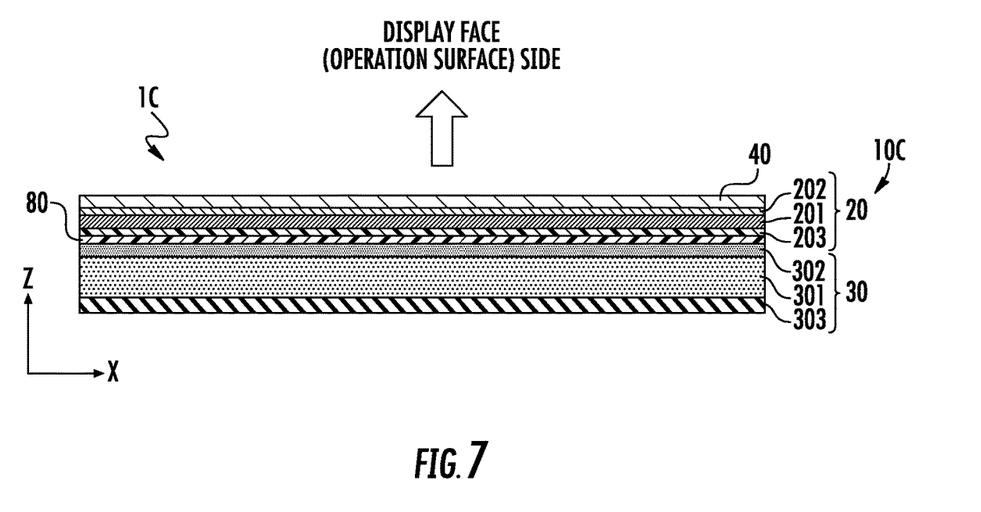
FIG. 7 is a cross-sectional view of a display panel with pressing sensor according to a fourth embodiment of the present invention.

A display panel with pressing sensor according to a fourth embodiment of the present invention will be described with reference to the drawing. The basic structure of the outer shape of an electronic device with pressing input function of this embodiment is the same as the electronic device 1 with pressing input function of the first embodiment except that the structure of a display panel 10C with pressing sensor is different. Thus, only the points different from the display panel 10 with pressing sensor of the first embodiment will be specifically described. FIG. 7 is a cross-sectional view of the display panel with pressing sensor according to the fourth embodiment of the present invention.

In the display panel 10C with pressing sensor, the pressing sensor 20 and the display panel 30 are spaced from each other, and a buffer member 80 is arranged therebetween. The buffer member 80 is made of a material having insulation properties and light transmittance. The buffer member 80 is made of a material having low resiliency.

Even with such a structure, like the above embodiments, the desired color displayed on the display panel can be provided to the operator. In addition, by having the buffer member, the operation surface is large, and even when the pressing sensor 20 has a large area, the planar face can be maintained flat, so that the pressing sensor 20 cannot be inhibited from being curved by pressing.

Figure 8:
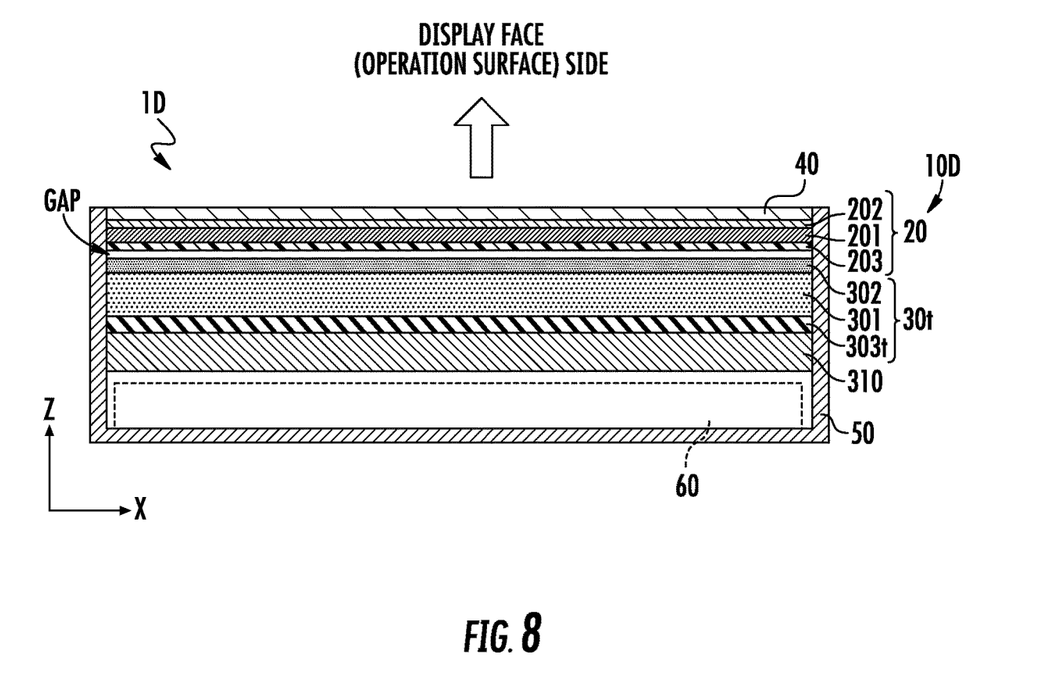
FIG. 8 is a cross-sectional view of a display panel with pressing sensor according to a fifth embodiment of the present invention.

A display panel with pressing sensor according to a fifth embodiment of the present invention will be described with reference to the drawing. The basic structure of the outer shape of an electronic device 1D with pressing input function of this embodiment is the same as the electronic device 1 with pressing input function of the first embodiment except that a display panel 30t is of the transmissive type. FIG. 8 is a cross-sectional view of the display panel with pressing sensor according to the fifth embodiment of the present invention.

As illustrated in FIG. 8, the display panel 30t has the liquid crystal panel 301, the front polarization plate 302, and a back polarization plate 303t. A backlight 310 is arranged on the display panel 30t on the computation circuit module 60 side.

Even when the display panel of the transmissive type is used, like the above embodiments, the desired color displayed on the display panel can be provided to the operator.

In the above embodiments, as the piezoelectric film of the chiral polymer, PLA and PLLA are given as an example, but even when a piezoelectric film, such as PDLA, having double refractivity is used, the above structures are applicable.

DESCRIPTION OF REFERENCE SYMBOLS 1, 1A, 1B, 1C, 1D Electronic device with pressing input function
10, 10A, 10B, 10C, 10D Display panel with pressing sensor
20, 20B Pressing sensor
30, 30t Display panel
40 Protection member
50 Housing
60 Computation circuit module
70 Position detection sensor
80 Buffer member
201 Piezoelectric film
202, 203 Electrode
202P, 203P Piezoelectric detection electrode
202D, 203D Electrostatic capacity detection electrode
301 Liquid crystal panel
302 Front polarization plate
303 Back reflection plate
701 Insulation substrate
702, 703 Electrode

The invention claimed is:

1. A display device comprising:
(a) a transparent touch plate to which a pressing force can be applied;
(b) a transparent pressing sensor comprising a piezoelectric film having upper and lower electrodes, the piezoelectric film including a chiral polymer which has double refractivity characteristics, the transparent pressing sensor being located below the transparent touch plate such that:
  (i) light passing through the transparent pressing sensor from a position below the transparent pressing sensor passes through the transparent touch plate; and
  (ii) the pressing force applied to the transparent touch plate is detected by the transparent pressing sensor;
(c) an image forming panel emitting polarized light that passes through the transparent pressing sensor, the image forming panel including a light source which emits non-polarized light, a liquid crystal panel and a single polarization plate, the liquid crystal panel being located between the light source and the single polarization plate such that non-polarized light emitted from the light source passes through the liquid crystal panel and thereafter the single polarization plate whereby light emitted from the single polarization plate is polarized only once before it passes through the transparent pressing sensor.

2. The display device according to claim 1, wherein the chiral polymer is polylactic acid.

3. The display device according to claim 2, wherein the polylactic acid is at least uniaxially stretched.

4. The display device according to claim 1, wherein the transparent pressing sensor detects both the pressing force and a touch position on the transparent touch plate.

5. The display device according to claim 1, further comprising a touch sensor that detects a touch position on the transparent touch plate.

6. The display device according to claim 1, further comprising a reflection plate arranged below the image forming panel, the reflection panel reflecting light emitted by the light source back through the liquid crystal panel as non-polarized light.

7. The display device according to claim 1, wherein the transparent touch plate is arranged adjacent an upper side of the transparent pressing sensor.

8. The display device according to claim 1, wherein the transparent pressing sensor has a lower side facing the image forming panel and the gap extends between the entire lower side of the transparent pressing sensor and the image forming panel.

9. An electronic device comprising:
the display device according to claim 1;
a computation unit that detects the pressing force based on a detection signal from the transparent pressing sensor; and
a housing having an opening through which the polarized light emitted by the image forming panel can be viewed by a user of the electronic device, the housing accommodating the transparent touch plate, the image forming panel and the computation unit.

10. The electronic device according to claim 9, wherein the chiral polymer is polylactic acid.

11. The electronic device according to claim 10, wherein the polylactic acid is at least uniaxially stretched.

12. The electronic device according to claim 9, wherein the transparent pressing sensor detects both the pressing force and a touch position on the transparent touch plate.

13. The electronic device according to claim 9, further comprising a touch sensor that detects a touch position on the transparent touch plate.

14. The electronic device according to claim 9, further comprising a reflection plate arranged below a lower side of the image forming panel, the reflection panel reflecting light emitted by the light source back through the liquid crystal panel as non-polarized light.

15. The electronic device according to claim 9, wherein the transparent touch plate is arranged adjacent an upper side of the transparent pressing sensor.

* * * * *